Jan. 4, 1938.   G. L. GREENE   2,104,642
MEASURING DEVICE
Filed July 22, 1935

INVENTOR:
GERTRUDE L. GREENE
BY Victor J. Evans & Co.
ATTORNEYS.

Patented Jan. 4, 1938

2,104,642

UNITED STATES PATENT OFFICE 2,104,642

MEASURING DEVICE

Gertrude L. Greene, Corona, Calif.

Application July 22, 1935, Serial No. 32,622

2 Claims. (Cl. 31—11)

This invention relates to improvements in measuring devices.

The principal object is to produce a device for measuring semisolid commodities, such as butter, lard and the like.

A further object is to provide means for extracting from a mass a predetermined amount of the mass and to later be able to eject this severed amount from the measuring apparatus.

Another object is to produce a device which is simple in construction, neat in appearance and one which may be easily cleaned.

A still further object is to produce a device which is economical to manufacture.

Other objects and advantages will be apparent during the course of the following description.

Figure 1:
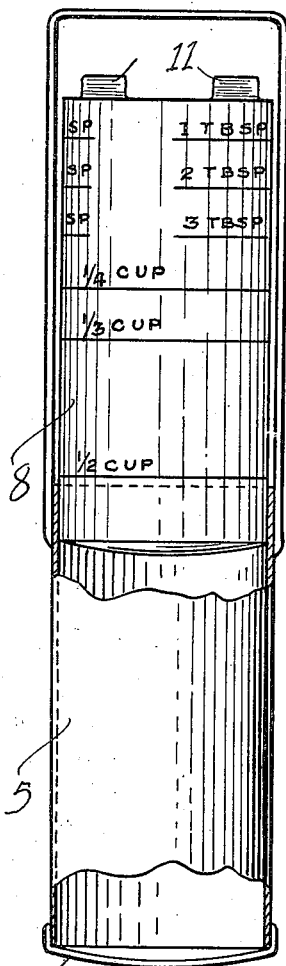
Figure 2:
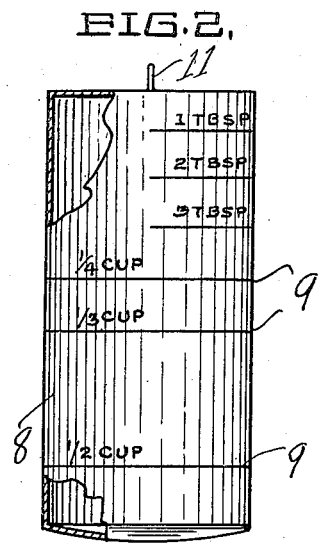
Figure 3:
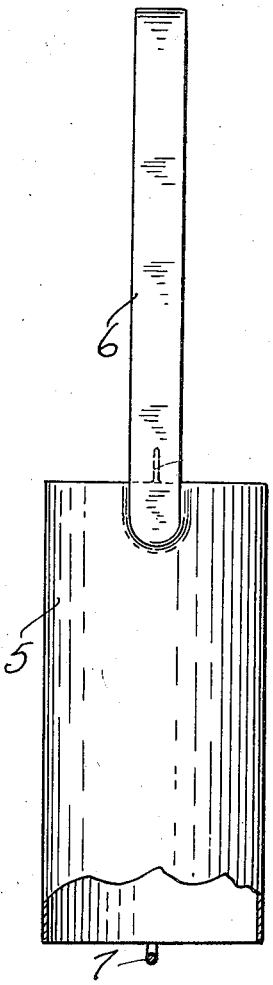
Figure 4:
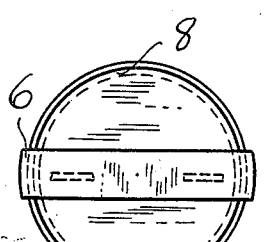
Figure 5:
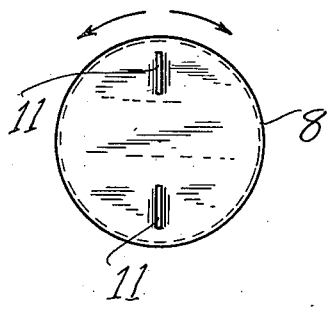

In the accompanying drawing forming a part of this specification and in which like numerals are employed to designate like parts throughout the same, Fig. 1 is a side elevation of my device showing a portion thereof broken away, Fig. 2 is a side elevation of the measuring gauge, Fig. 3 is a side elevation of the cutting element taken at right angle to Fig. 1, Fig. 4 is a top plan view of Fig. 1, and Fig. 5 is a top plan view of Fig. 2.

Many recipes require a definite amount of shortening, such as, one-half cup. Heretofore it has been necessary to remove from the mass with a spoon or other implement the estimated amount of shortening and place the same in a measuring cup, packing it down and endeavoring to level off at a point within the cup. Then it is also tedious to extract this measured amount and often some of the shortening is left within the cup. Applicant, therefore, has devised an apparatus which will quickly overcome these difficulties.

In the accompanying drawing wherein for the purpose of illustration is shown a preferred embodiment of my invention, the numeral 5 designates a tubular cutter having a handle 6 at one end thereof and a cross wire 7 at the opposite end thereof. Slidably positioned within the tubular member is a gauge 8, upon the outer periphery of which are lines 9 adjacent which indicia are placed. Thumb pieces 11 are secured to the top of the gauge whereby the same may be manipulated.

The manner of using my device is as follows:—

Assuming that a person desires a half cup of shortening, the measure is taken in the hand by its handle 6, the tubular member 5 is pushed into the mass of shortening about an inch, more or less, then by rotating the tubular member about its axis through the medium of the handle 6, the cross wire 7 will cut off the shortening. It is then withdrawn from the mass of shortening and the same performance is repeated (this repeated withdrawal helps to enlarge the bore in the fat and breaks the suction which might be objectionable) until the shortening, as it enters the tubular member, raises the gauge 8 so that the line 9 adjacent the one-half cup mark appears just at the top of the tubular member. Then by pushing upon the top of the gauge 8 the measured quantity within the tubular member may be expressed into a suitable receptacle. Upon revolving the gauge 8 by means of the thumb pieces 11 the clinging shortening will be released.

It will thus be seen that my measure will perform all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a measuring device, the combination with a tubular member open at both ends, a cross wire extending across one end of said tubular member, and a handle secured to the opposite end of said tubular member, said handle being substantially U-shaped and having its legs parallel to the sides of said tubular member, the length of said handle being greater than the length of said tubular member, whereby a sliding gauge may pass between the legs of said handle and enter the open end of said tubular member.

2. In a measuring device, the combination with a tubular member open at both ends, a cross wire extending across one end of said tubular member, and a handle secured to the opposite end of said tubular member, said handle being substantially U-shaped and having its legs parallel to the sides of said tubular member, the length of said handle being greater than the length of said tubular member, whereby a sliding gauge may pass between the legs of said handle and enter the open end of said tubular member, said gauge being of the same length as the tubular member and having means projecting from its opposite end whereby said gauge may be rotated.

GERTRUDE L. GREENE.